(12) United States Patent
Maxwell et al.

(10) Patent No.: US 9,307,073 B2
(45) Date of Patent: Apr. 5, 2016

(54) VISUAL ASSISTANCE SYSTEMS AND RELATED METHODS

(71) Applicant: Sorenson Communications, Inc., Salt Lake City, UT (US)

(72) Inventors: Conrad Arlo Maxwell, Herriman, UT (US); Richard Shields, Salt Lake City, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 169 days.

(21) Appl. No.: 14/145,589

(22) Filed: Dec. 31, 2013

(65) Prior Publication Data

US 2015/0189071 A1 Jul. 2, 2015

(51) Int. Cl.
*H04M 11/00* (2006.01)
*H04M 1/725* (2006.01)
*H04M 11/04* (2006.01)

(52) U.S. Cl.
CPC ........ *H04M 1/72594* (2013.01); *H04M 11/045* (2013.01); *H04M 2250/52* (2013.01)

(58) Field of Classification Search
CPC ............... H04M 1/72594; H04M 2242/04; H04M 2250/52
USPC ..................................... 379/37–51
See application file for complete search history.

(56) References Cited

U.S. PATENT DOCUMENTS 5,973,618 A * 10/1999 Ellis ...................... A61H 3/061
135/75
6,278,944 B1 8/2001 Lui et al.
7,864,991 B2 1/2011 Espenlaub et al.
8,605,141 B2 * 12/2013 Dialameh ......... G06F 17/30247
348/157
8,886,462 B1 * 11/2014 Cioffi .................... A61H 3/061
701/533
2007/0197261 A1 * 8/2007 Humbel ................ G06Q 30/00
455/558
2013/0250078 A1 * 9/2013 Levy ..................... A61F 9/08
348/62

FOREIGN PATENT DOCUMENTS

| EP | 2371339 | 5/2011 |
|---|---|---|
| WO | 2008015375 | 2/2008 |
| WO | 2013046234 | 4/2013 |
| WO | 2013124160 | 8/2013 |

OTHER PUBLICATIONS

HumanWare, Trekker Breeze handheld talking GPS; http://www.humanware.com/en-usa/products/blindness/talking_gps/trekker_gps/trekker_breezeI.details/id_101/trekker_breeze_handheld_talking_gps.html; taken from site Nov. 20, 2013.

* cited by examiner

*Primary Examiner* — Hemant Patel
(74) *Attorney, Agent, or Firm* — TraskBritt

(57) ABSTRACT

Visual assistance systems and related methods are disclosed. A visual assistance system includes a visual assistance service configured to receive and display images from a user device on an electronic display for a live assistant. The visual assistance service is also configured to transmit assistant audio from the live assistant conveying information derived by the live assistant's review of the images. A visual assistance system comprises a user device configured to capture and transmit the images to the visual assistance service. The user device is also configured to receive the assistant audio from the visual assistance service, and reproduce the assistant audio to a user of the user device. The user is registered with the visual assistance service as having at least a minimum level of visual disability. A method of operating the visual assistance system includes receiving the images from, and transmitting the assistant audio to the user device.

19 Claims, 7 Drawing Sheets

VISUAL ASSISTANCE SYSTEMS AND RELATED METHODS

TECHNICAL FIELD

The present disclosure relates to visual assistance systems, and methods of operating visual assistance systems. More particularly, the present disclosure relates to live visual assistance for visually-impaired people.

BACKGROUND

Visually-capable people often rely on sight to interact with the world around them. For example, people often rely on sight to locate obstacles (e.g., stairs, damaged walkways, low hanging branches, etc.), and other objects (e.g., doors, chairs, etc.), and receive information (e.g., location, identity of other people, information conveyed by signs and traffic signals, information conveyed in text on paper and on digital displays, etc.). Visually-impaired (e.g., blind) people often use their non-visual senses (e.g., touch, hearing, etc.) to interact with the world around them.

Conventional methods and devices that help visually-impaired and blind people to use their other senses to interact with the world around them are known in the art. Some of these methods and devices help visually-impaired and blind people to navigate from place to place. For example, talking global positioning system (GPS) devices utilize GPS technology to identify the location of a person, and audibly announce details regarding the location. Also, mobility canes and Seeing Eye dogs are commonly used to help visually-impaired people avoid obstacles and locate other objects. Additionally, there may be conventional methods and devices that help visually-impaired people to analyze documents, and receive information conveyed by text. For example, application software is available for smartphones that enable people to identify currency, and convert emails and text messages to voice.

BRIEF SUMMARY

In some embodiments, the present disclosure comprises a visual assistance system. The visual assistance system comprises a visual assistance service. The visual assistance service comprises a database identifying a plurality of user devices that are registered with the visual assistance service as being associated with a plurality of users having at least a minimum level of visual disability. The visual assistance service is configured to receive a call from a user device of the plurality of user devices. The visual assistance service is also configured to receive and display one or more images from the user device on an electronic display for a live assistant. The visual assistance service is further configured to transmit assistant audio to the user device, the assistant audio comprising the live assistant's speech conveying information derived by the live assistant's review of the one or more images.

In some embodiments, the present disclosure comprises a method of operating a visual assistance system. The method comprises receiving a call from a user device being registered with a visual assistance service as being associated with a user having at least a minimum level of visual disability. The method also comprises receiving one or more images from the user device at the visual assistance service during the call, and displaying the one or more images for a live assistant on an electronic display at the visual assistance service. In addition, the method includes transmitting assistant audio comprising speech descriptive of the one or more images from the live assistant to the user device.

In some embodiments, the present disclosure comprises a visual assistance system. The visual assistance system includes a user device. The user device is configured to initiate communications with a visual assistance service from a user that is registered with the visual assistance service as having at least a minimum level of visual disability. The user device is also configured to capture one or more images, and transmit the one or more images to the visual assistance service. The user device is further configured to receive assistant audio descriptive of the one or more images from a live assistant at the visual assistance service, and reproduce the assistant audio as audible sound to the user of the user device.

DETAILED DESCRIPTION

Figure 1:
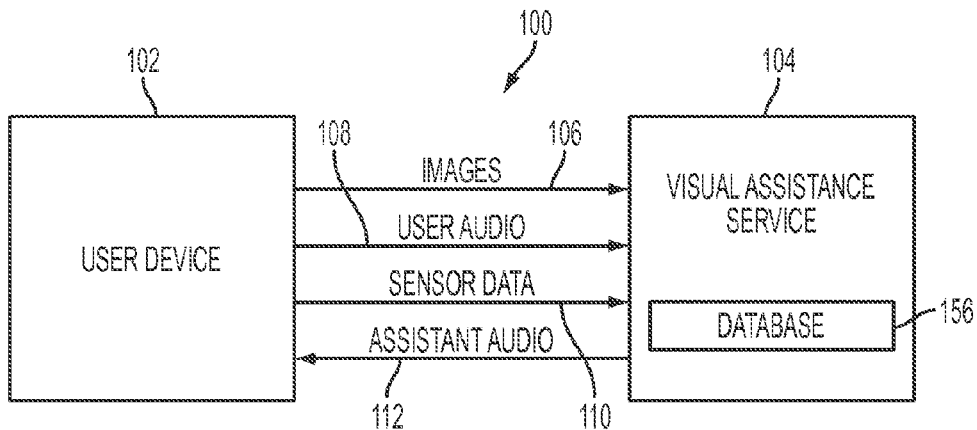
FIG. 1 is a simplified block diagram of a visual assistance system according to an embodiment of the present disclosure.

In the following detailed description, reference is made to the accompanying drawings which form a part hereof, and in which is shown by way of illustration specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions rearrangements, or combinations thereof within the scope of the present disclosure may be made and will become apparent to those of ordinary skill in the art.

In accordance with common practice the various features illustrated in the drawings may not be drawn to scale. The illustrations presented herein are not meant to be actual views of any particular apparatus (e.g., device, system, etc.) or method, but are merely idealized representations that are employed to describe various embodiments of the present disclosure. Accordingly, the dimensions of the various features may be arbitrarily expanded or reduced for clarity. In addition, some of the drawings may be simplified for clarity.

Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media (i.e., non-transitory media) and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments of the present disclosure include systems and related methods for providing visual assistance to visually-impaired people. FIG. 1 is a simplified block diagram of a visual assistance system 100 according to an embodiment of the present disclosure. The visual assistance system 100 may include a user device 102 and a visual assistance service 104 configured to communicate with each other. A user of the user device 102 may be registered with the visual assistance service 104 (e.g., in a database 156 of the visual assistance service 104) as having at least a minimum level of visual disability (e.g., legal blindness). The visual assistance service 104 may be configured to receive incoming calls from the registered user devices 102 and provide visual assistance to the user of the user device 102. In particular, the visual assistance system 100 may be useful for providing visual assistance to visually-impaired people, especially where conventional methods and devices fail to provide sufficient information.

By way of non-limiting example, a visually-impaired user may be lost (e.g., within a building, outdoors, etc.) or encounter a situation that they are unfamiliar with (e.g., encountering an accident, an unknown obstacle, etc.). In another example, a visually-impaired user may have difficulty identifying different selections, such as on an electronic device, selecting a product, etc. In yet another example, the visually impaired user may desire to read text from their surroundings (e.g., a sign, information displayed in a classroom, etc.). The visual assistance system 100 may assist the visually-impaired user with these, and other similar problems, by enabling the user to transmit one or more images 106 (sometimes referred to herein simply as "images" 106) of the surrounding area to the live assistant, who may view the images 106 and provide guidance to the visually-impaired user.

The user device 102 may be configured to capture one or more images 106, and transmit the images 106 to the visual assistance service 104. The images 106 may include still images and video images.

The visual assistance service 104 may include a live assistant who views the images 106 and provides speech comprising information about the images 106 via assistant audio 112. The assistant audio 112 may comprise audio data including audible speech from the live assistant. The user and the live assistant may also engage in verbal conversation via user audio 108 comprising audio data including audible speech from the user, and the assistant audio 112. The visual assistance service 104 may be organized as a call center that includes a plurality of live assistants at their call stations that await calls from the visually-impaired users to provide the desired assistance. In some embodiments, the visual assistance service 104 may be a service that is paid for with government funding, by the visually-impaired users themselves, by third-party donors, or a combination thereof. In embodiments where the visual assistance service 104 is at least partially subsidized, the visually-impaired users may be required to be certified (e.g., by a doctor, or self certification) to meet a minimum standard of visual disability for qualifying to use the visual assistance service 104.

In some embodiments, the user device 102 may also be configured to transmit sensor data 110 to the visual assistance service 104. The sensor data 110 may include data from a GPS chip, an ultrasonic proximity sensor, a motion sensor, an accelerometer, other sensors, and combinations thereof. The sensor data 110 may be used by the live assistant to supplement information provided by the one or more images from the user device 102.

The images 106, the user audio 108, the sensor data 110, and the assistant audio 112 may be communicated via one or more networks. The networks may include an internet protocol (IP) network. The networks may also include other networks, such as, for example, public switched telephone networks (PSTNs). The networks may include a a cellular telephone network, a wide area network (WAN), a local area network (LAN), a personal area network (PAN), and combinations thereof. In some embodiments, the networks may include a cloud network. The networks may be configured to facilitate wireless communications, communications through cables, and combinations thereof. Some non-limiting examples of suitable wireless communications may include "WiFi," Bluetooth, and mobile wireless networks. Some non-limiting examples of suitable cables include fiber-optic cables, coaxial cables, traditional telephone cables, and Ethernet cables.

In some embodiments, the visual assistance service 104 may also be configured as a call routing service to assist the user of the user device 102 to place calls (e.g., standard or cellular phone calls). For example, the user may speak a telephone number, or a name of a person or business the user desires to call to the live assistant via the user audio 108. The live attendant may dial the telephone number, or otherwise route the call to the desired third party. The live attendant may also guide the user to a location of the third party using GPS sensor data 110 and images 106. The visual assistance service 104 may also provide emergency services, such as by calling 911 or other emergency services to further assist the visually-impaired user if desirable for the situation.

Figure 2:
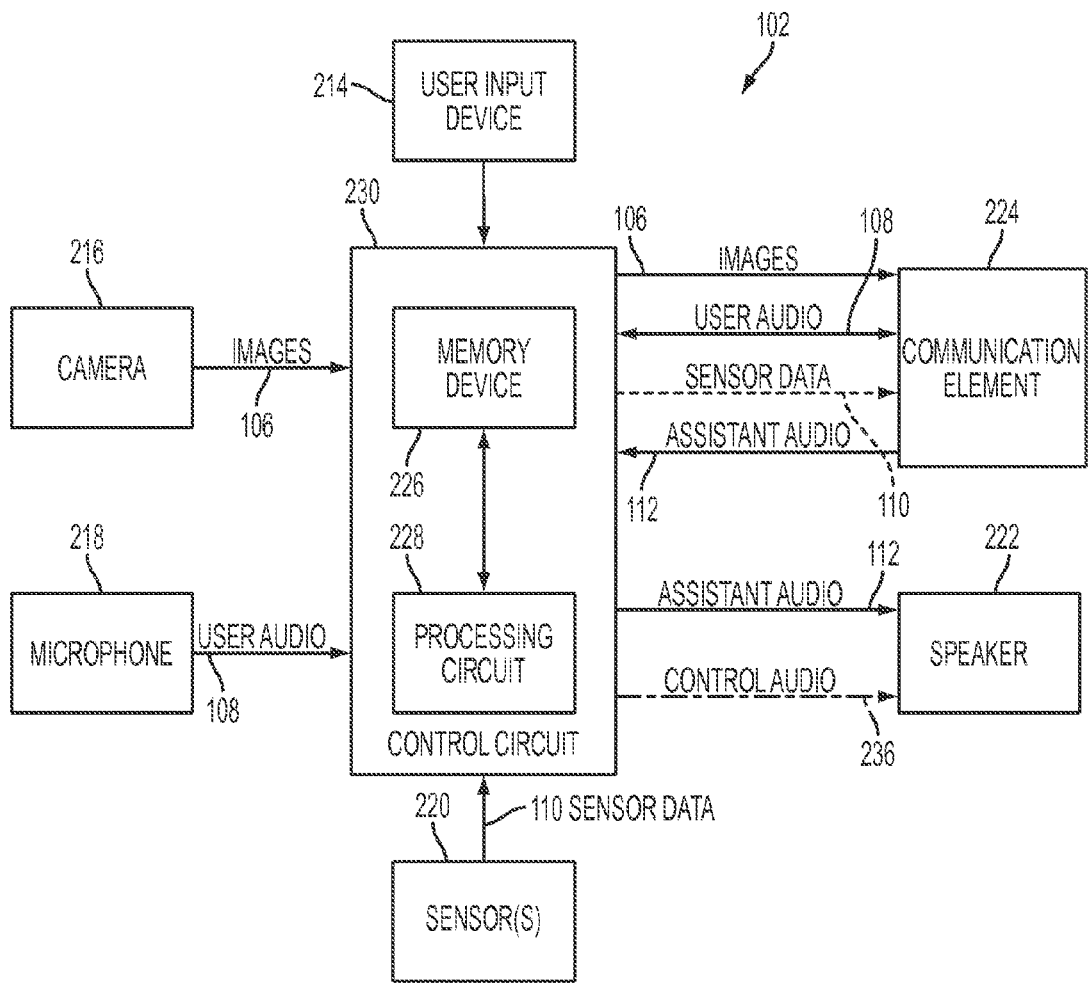
FIG. 2 is a simplified block diagram of the user device of FIG. 1.

FIG. 2 is a simplified block diagram of the user device 102 of FIG. 1. The user device 102 may include a control circuit 230 operably coupled to a user input device 214 (e.g., a call button), a camera 216, an audio output device 222, an audio input device 218, at least one communication element 224 (sometimes referred to herein as "communication element 224"), and one or more sensors 220 (sometimes referred to herein as "sensors 220"). The control circuit 230 may be configured to cause the user device 102 to establish communication with the visual assistance service 104 (FIG. 1) responsive to the user engaging the user input device 214 (e.g., pressing a call button). For example, the control circuit 230 may cause the communication element 224 to transmit a request to the visual assistance service 104 to initiate a communication session between the user device 102 and the visual assistance service 104 (e.g., a phone call). If the request is granted by the visual assistance service 104, the communication session may be established. By way of non-limiting example, the user input device 214 may include a call button that is textured to enable visually-impaired users to locate the call button by touch, and initiate communication sessions with the live assistant at the visual assistance service 104. The call button may be a dedicated call button separate from other keypads, and that is configured to initiate a call directly to the visual assistance service 104 without dialing a full phone number.

During communication sessions, the camera 216 may capture one or more images 106, and provide the images 106 to the control circuit 230. The control circuit 230 may transmit the images 106 to the visual assistance service 104 (FIG. 1) through the communication element 224. The control circuit 230 may also receive the assistant audio 112 from the visual assistance service 104 through the communication element 224, and provide the assistant audio 112 to the audio output device 222. In addition, the audio input device 218 may convert audible speech from the user and the environment around the user to user audio 108, and provide the user audio 108 to the control circuit 230. The control circuit 230 may transmit the user audio 108 to the visual assistance service 104 through the communication element 224. The sensors 220 may provide the sensor data 110 to the control circuit 230. The control circuit 230 may transmit the sensor data 110 to the visual assistance service 104 through the communication element 224. In addition, the control circuit 230 may produce control audio 236 (e.g., synthesized speech giving navigational instructions, audio alerts responsive to detected hazards, etc.) responsive to the sensor data 110, and provide the control audio 236 to the audio output device 222.

The camera 216 may be configured in a variety of arrangements. The camera 216 may be part of a mobile communication device, an earphone device, a watch, a headband, clothing, a hat, jewelry a mobility cane, a pin, a clip, or among other suitable arrangements. Accordingly, the camera 216 may be configured for securing to the user, in a handheld configuration, or combinations thereof. In some embodiments, the camera 216 may be configured to capture images 106 in an approximately forward direction from the perspective of the user. In some embodiments, the camera 216 may be configured to capture images 106 at other angles. In some embodiments, the user device 102 may comprise more than one camera 216, each configured to capture images 106 and audio from different angles, positions, devices, or combinations thereof. In some embodiments, the camera 216 may be configured to be manually pointed in a direction desired by the user.

In some embodiments, the camera 216 may comprise a video camera. Accordingly, the images 106 may comprise video images. By way of non-limiting example, the camera 216 may be configured to produce constant video images throughout the duration of the communication session. Also by way of non-limiting example, the camera 216 may be configured to start capturing video images and stop capturing the video images responsive to activation and deactivation by one of the user and the live assistant. As a further example, the camera 216 may be configured to capture video for a predetermined amount of time (e.g., 5 seconds) responsive to initiation of a communication session, or activation of the video camera. In some embodiments, the camera 216 may be configured to capture still images. By way of non-limiting example, the camera 216 may be configured to periodically capture still images. Also by way of non-limiting example, one or both of the user and the live assistant may manually control when the camera 216 captures the still images. Furthermore, the camera 216 may be configured for selectively operating in one of a video image mode, and a still image mode.

The audio output device 222 may be configured to convert the assistant audio 112 to a form perceivable by the user and may be implemented in a variety of configurations. For example, the audio output device 222 may be implemented in a handheld device, as a loudspeaker, an earphone, or some other configuration. In addition, the audio output device 222 may be implemented as a direct output device, such as, for example, a cochlear implant or other suitable device. If implemented in an earphone or cochlear implant, the audio output device 222 may be configured to provide the audible speech from the assistant audio 112 such that the speech may not be heard by people other than the user. For ease of description the audio output device 222 may be referred to herein as a speaker 222 with the understanding that it may be embodied in any of the examples discussed herein as well as their equivalents.

The audio input device 218 (may also be referred to herein as a microphone 218 for ease of description) may be configured to convert audible speech from the user and other sounds near the user to user audio 108, and provide the user audio 108 to the control circuit 230. In embodiments where the camera 216 captures video images, the control circuit 230 may receive user audio 108 synchronized with the video images. The user audio 108 may be sent to the visual assistance service 104 to be heard by the live assistant in synchronization with viewing of the corresponding video images. The microphone 218 may be implemented in a variety of configurations. For example, the microphone 218 may be implemented with an earphone, a handheld device, or in some other configuration. In some embodiments, if the microphone is configured for placement near the user's mouth, the user may be able to speak sufficiently quietly, or muffle the sound enough, to enable the user to keep a conversation with the live assistant relatively private. In some embodiments, the microphone 218 may be implemented with a stenomask to keep the conversation private, prevent the conversation from disrupting a quiet environment, or a combination thereof. A classroom may be one environment where such an embodiment may be particularly useful.

The sensors 220 may include a global positional system (GPS) device, a motion detector, an ultrasonic proximity sensor, an accelerometer, other sensors, and combinations thereof. The sensors 220 may be configured to provide sensor data 110 to enhance the user experience of the user device 102, provide information to the live assistant to supplement information from the images 106, or a combination thereof.

In some embodiments, the sensors 220 may include a GPS device. By way of non-limiting example, the control circuit 230 may be configured to cause the speaker 222 to deliver automated audible navigational directions to the user if the user device 102 is not participating in a communication session. If the user is participating in a communication session with the live assistant, the sensor data 110 from the GPS device may be sent to the visual assistance service 104. The live assistant may use the sensor data 110 from the GPS device to see the user's location on a map, and to provide directions to a desired destination. The use of sensor data 110 with the images 106 may enable the live assistant to give navigational directions enhanced by warnings of visually apparent obstacles.

In some embodiments, the sensors 220 may comprise a motion detector. By way of non-limiting example, the motion detector may utilize the images 106 from the camera 216 to detect motion. Also by way of non-limiting example, the motion detector may include a device that emits energy, and senses motion by analyzing reflected energy. The energy may include infrared or microwave radiation, ultrasonic emissions, other suitable energy, or combinations thereof. In some embodiments, when the motion detector detects motion, the control circuit 230 may be configured to cause the speaker 222 to audibly indicate the motion (e.g., a beep, an automated verbal description of a location relative to the user where the motion occurred, etc.). The user may then initiate a communication session with the visual assistant service by engaging the user input device 214, and ask the live assistant to identify the moving object using the images 106. Sensor data 110 from the motion detector may also be sent to the visual assistance service 104 during communication sessions with the visual assistance service 104.

In some embodiments, the sensors 220 may include an ultrasonic proximity sensor. By way of non-limiting example, the ultrasonic proximity sensor may be incorporated into an earphone or glasses, and may be configured to detect head-level obstacles. The control circuit 230 may be configured to cause the speaker 222 to produce an audio alert (e.g., a beep, an automated verbal description of a location relative to the user where the obstacle is located, etc.) responsive to a detection of a head-level obstacle. As with the motion detector, the user may engage the user input device 214 and ask the live assistant to identify the detected object using the images 106. Also by way of non-limiting example, the ultrasonic proximity sensor may be configured for detecting obstacles at other levels, including at foot level, knee level, waste level, chest level, other level, or combinations thereof. Sensor data 110 from the ultrasonic proximity sensor may also be sent to the visual assistance service 104 during communication sessions.

In some embodiments, the sensors 220 may include an accelerometer. By way of non-limiting example, the accelerometer may be configured to enable the control circuit 230, the visual assistance service 104, or a combination thereof, to detect when the user takes steps while walking. In other words, the accelerometer may add pedometer functionality. Sensor data 110 from the accelerometer may be used with sensor data 110 from a GPS device to estimate the average number of steps per unit of distance traveled by the user. Such information may enable the live assistant to provide estimates of a number of steps before the user reaches a destination. Also by way of non-limiting example, sensor data 110 from the accelerometer may be used to detect catastrophic events. A maximum threshold level of acceleration may be set corresponding to an estimated level of acceleration that may cause injury to the user. The control circuit 230 may be configured to automatically call the visual assistance service 104 responsive to a detection of acceleration that exceeds the maximum threshold level. The live assistant may inquire whether the user suffered some injury, and receive images 106, and contact appropriate emergency authorities if needed or desired. Thus, even if the user is unconscious, the live assistant me be enabled to identify a dangerous situation by viewing the images 106. Other information may also be attained by analyzing sensor data 110 from the accelerometer.

While the user device 102 is not participating in a communication session, the control circuit 230 may provide some assistance to the user. In some embodiments, the control circuit 230 may utilize the sensor data 110 to produce control audio 236. The control audio 236 may comprise audio alerts, recorded or synthesized speech, or combinations thereof responsive to the sensor data 110. By way of non-limiting example, if the sensor data 110 indicates a hazard or obstacle (e.g., sensor data 110 from a motion detector or ultrasonic proximity detector), the control circuit 230 may produce control audio 236 comprising an audio alert indicating the hazard or obstacle. Also by way of non-limiting example, if the sensor data 110 comprises GPS data, the control circuit 230 may produce control audio 236 comprising audio directions to a desired destination. In some embodiments, the control circuit 230 may also provide information to the user tactilely (e.g., vibrations). During communication sessions, the user may converse via user audio 108 and assistant audio 112 with the live assistant, who may be provided access to the images 106, and in some embodiments, the sensor data 110. Accordingly, the user may receive well-informed verbal guidance from the live assistant.

The control circuit 230 may include a memory device 226 operably coupled to a processing circuit 228. The memory device 226 may comprise a non-transitory computer readable medium. By way of non-limiting example, the memory device 226 may comprise a read-only memory (ROM), a random-access memory (RAM), flash memory, an electrically programmable read-only memory (EPROM), a hard disk drive (HDD), or combinations thereof. The memory device 226 may be configured to store computer-readable instructions (e.g., a software application) directed to implementing at least a portion of the functions the control circuit 230 is configured to perform. The processing circuit 228 may comprise a microcontroller, a field programmable gate array (FPGA), a central processing unit (CPU), an application-specific integrated circuit (ASIC), other device configured to execute computer-readable instructions, and combinations thereof.

The user device 102 may be implemented in various different configurations. In some embodiments, the user device 102 may comprise a mobile communication device configured to execute application software directed to the functionality of the user device 102. Many mobile communication devices known in the art (e.g., smartphones, tablet computers, etc.) include cameras, speakers, microphones, communication elements, and control circuits. Thus, any of various conventional mobile communication devices may be modified with application software directed to operation as the user device 102. In addition, the user device 102 may be implemented as a dedicated mobile communication device. For example, the user device 102 may comprise a mobile communication device configured to be held by the user (e.g., a mobile phone, a mobility cane, etc.), or for securing to the user (e.g., an earphone, a pair of glasses, a watch, a headband, clothing, a hat, jewelry, a pin, a clip, etc.). In some embodiments, the user device 102 may comprise a mobile communication device in communication with one or more separate devices, as will be discussed in more detail with respect to FIG. 3.

Figure 3:
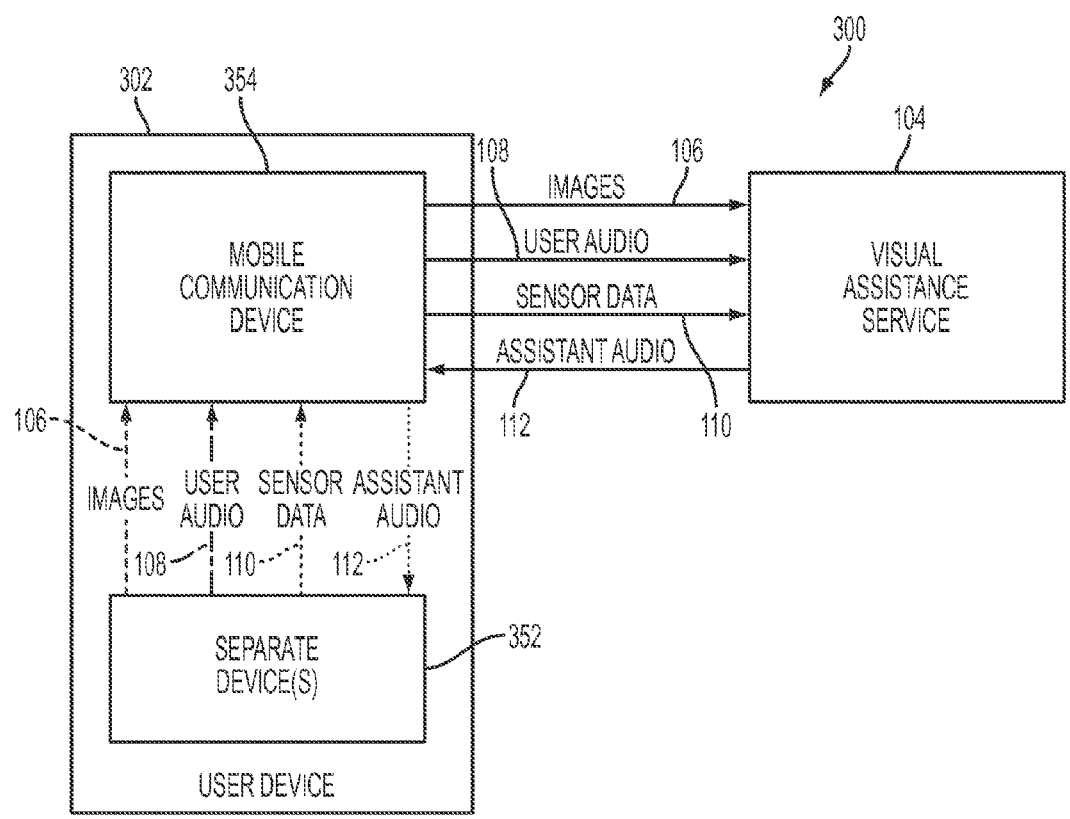
FIG. 3 is a simplified block diagram of a visual assistance system according to an embodiment of the present disclosure.

FIG. 3 is a simplified block diagram of a visual assistance system 300 according to an embodiment of the present disclosure. The visual assistance system 300 may include user device 302 configured to communicate with a visual assistance service 104, which may be similar to the visual assistance service 104 of FIG. 1. The user device 302 may comprise a mobile communication device 354, and one or more separate devices 352 (sometimes referred to herein as "separate devices" 352). The mobile communication device 354 and the separate devices 352 may be configured to communicate with each other (e.g., through Bluetooth, WiFi, or a cable).

The mobile communication device 354 and the separate devices 352 may each include a portion of the components of the user device 102 as discussed with respect to FIG. 2 (e.g., the user input device 214, the camera 216, the microphone 218, the sensors 220, the speaker 222, the communication element 224, and the control circuit 230) in a variety of different arrangements and combinations. By way of non-limiting example, the mobile communication device 354 may include a mobile phone (e.g., smartphone, cell phone, etc.) comprising the control circuit 230 and the communication element 224, and the separate devices 352 may include the user input device 214, the camera 216, the microphone 218, and the speaker 222. Also by way of non-limiting example, the mobile communication device 354 may comprise a mobile phone comprising the control circuit 230, the communication element 224, and some of the one or more sensors 220, and the separate devices 352 may include a first separate device (e.g., glasses) including the camera 216, and a second separate device (e.g., an earphone) comprising the microphone 218, the speaker 222, another camera 216, and others of the one or more sensors 220. Other configurations and combinations not explicitly discussed herein are also contemplated and within the scope of the present disclosure.

FIGS. 4 through 7 are simplified perspective views of an earphone 400, a pair of glasses 500, a watch 600, and a mobility cane 700 (sometimes referred to herein together as "devices 400, 500, 600, and 700"), respectively, that the user device 102, 302 (FIGS. 1, 2, and 3) may comprise, according to embodiments of the present disclosure. In some embodiments, the devices 400, 500, 600, and 700 may be configured as a dedicated, standalone user device 102. In some embodiments, the user device 302 may comprise a mobile communication device 354 and one or more of the devices 400, 500, 600, and 700 as separate devices 352 (FIG. 3). In some embodiments, the mobile communication device 354 of the user device 302 may include one or more of the devices 400, 500, 600, and 700. In some embodiments, the user device 102, 302 may not comprise any of the devices 400, 500, 600, and 700.

Figure 4:
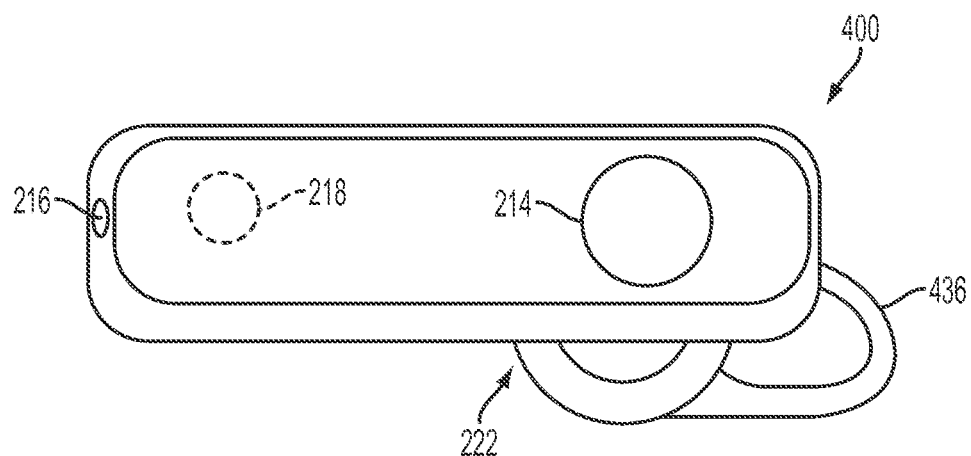
FIG. 4 is a simplified perspective view of an earphone that may be comprised by the user device of FIGS. 1 and 2.

FIG. 4 is a simplified perspective view of an earphone 400 that the user device 102, 302 may comprise. In some embodiments, the earphone 400 may include the user input device 214, the camera 216, the speaker 222, and an ear coupler 436 configured for coupling the earphone 400 with the user's ear. Thus, in some embodiments, the earphone 400 may be one of the mobile communication device 354 and the separate devices 352 (FIG. 3). In some embodiments, the earphone 400 may also comprise the microphone 218, the control circuit 230, the communication element 224, the sensors 220, or combinations thereof (FIG. 2). Thus, in some embodiments the earphone 400 may be a standalone user device 102.

As the earphone 400 may be configured for coupling with the user's ear, the camera 216 may be configured to capture images 106 from a head-level perspective of the user. Similarly, in embodiments where the earphone 400 includes the sensors 220, the sensors 220 may be configured to detect head-level objects, events, accelerations, etc., or combinations thereof.

Figure 5:
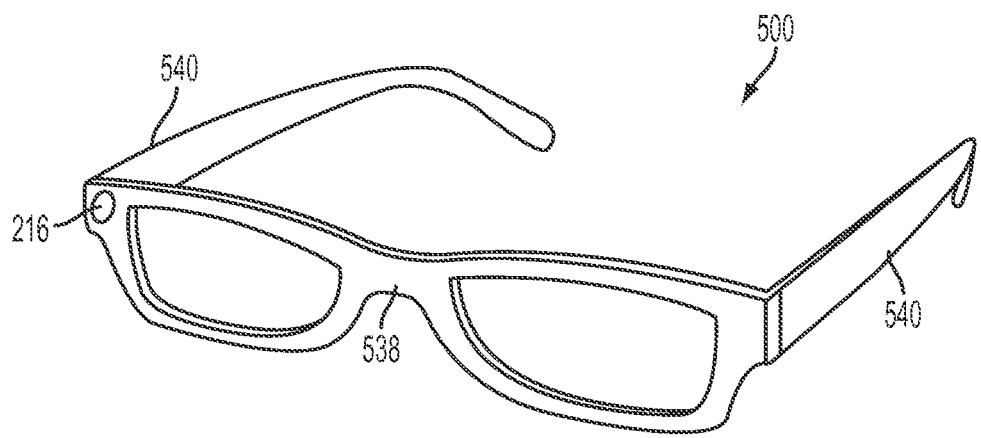
FIG. 5 is a simplified perspective view of a pair of glasses that may be comprised by the user device of FIGS. 1 and 2.

FIG. 5 is a simplified perspective view of a pair of glasses 500 (sometimes referred to herein as "glasses 500") that the user device 102, 302 may comprise. The glasses 500 may be configured as a standalone user device 102, or as one of the mobile communication device 354 and the separate devices 352. The glasses 500 may comprise a front surface 538, and two side surfaces 540. In some embodiments, the camera 216 may be located on the front surface 538 of the glasses 500, as illustrated in FIG. 5. In some embodiments, the camera 216 may be located on one of the two side surfaces 540. In some embodiments, more than one camera 216 may be located in the front surface 538, one or more of the two side surfaces 540, or combinations thereof. In some embodiments, the glasses 500 may also comprise the speaker 222, the user input device 214, the microphone 218, the control circuit 230, the communication element 224, the sensors 220, or combinations thereof (FIG. 2).

The glasses 500 may be configured for wearing by the user similarly to conventional glasses. For example, portions of the glasses 500 may be configured to rest on the user's nose and ears. When the glasses 500 are thus positioned on the user's face, the camera 216 and sensors 220 may benefit from the advantages of being positioned at head-level, similarly to the earphone 400. The glasses 500, however, may additionally benefit from advantages of being positioned in front of the user's face. For example, a camera 216 placed on the front surface 538 of the glasses 500 may provide the live assistant at the visual assistance service 104 with images 106 taken from a similar perspective to what the user's eyes would observe.

Figure 6:
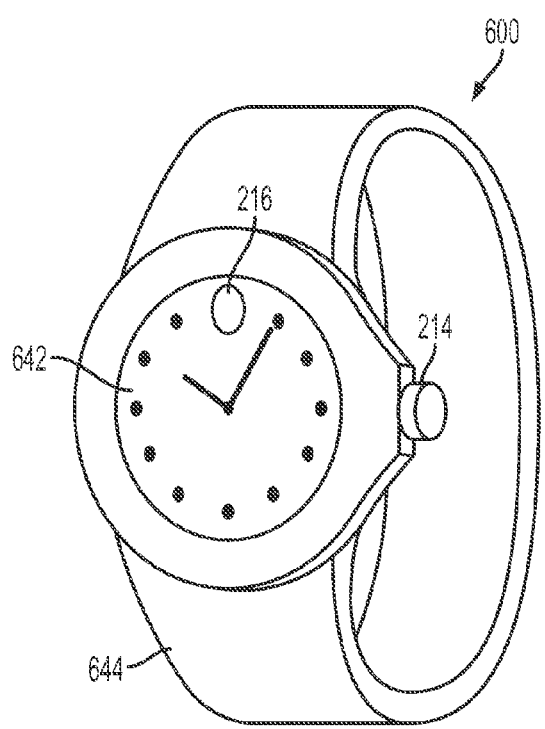
FIG. 6 is a simplified perspective view of a watch that may be comprised by the user device of FIGS. 1 and 2.

FIG. 6 is a simplified perspective view of a watch 600 that the user device 102, 302 may comprise. The watch may be configured as a standalone user device 102 or as one of the mobile communication device 354 and the separate devices 352 (FIG. 3). The watch 600 may comprise a face 642 coupled to a wrist band 644. The watch 600 may be configured for securing to the user's wrist with the wrist band 644. The camera 216 may be located in the face 642, or the wrist band 644. In some embodiments, the watch 600 may also comprise the speaker 222, the microphone 218, the control circuit 230, the communication element 224, the sensors 220 (FIG. 2), the user input device 214, or combinations thereof. In some embodiments, the watch may include a plurality of cameras 216 configured to capture images 106 from different perspectives.

Figure 7:
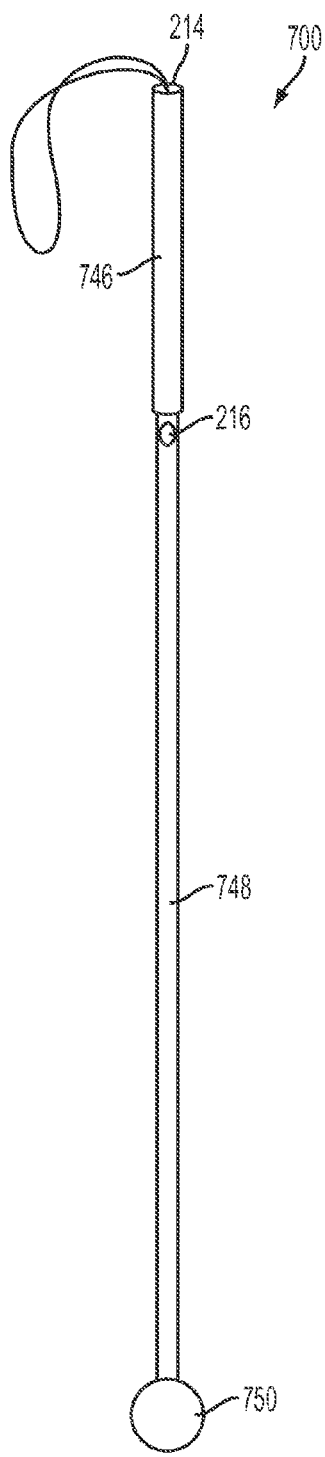
FIG. 7 is a simplified perspective view of a mobility cane that may be comprised by the user device of FIGS. 1 and 2.

FIG. 7 is a simplified perspective view of a mobility cane 700 that the user device 102, 302 may comprise. The mobility cane 700 may be configured as a standalone user device 102, or as one of the mobile communication device 354 and the separate devices 352 (FIG. 3). The mobility cane 700 may be configured to serve the general purposes of conventional mobility canes to provide physical guidance to the user. Additionally, the mobility cane 700 may be configured with one or more cameras 216. One or more cameras 216 may be located in a handle 746, a middle section 748, a tip 750 of the mobility cane 700, or combinations thereof. In some embodiments, the mobility cane 700 may also comprise the user input device 214. For example, the user input device 214 may be located on top of the handle, or other location easily identified by the user. In some embodiments, the mobility cane 700 may also comprise the speaker 222, the microphone 218, the control circuit 230, the communication element 224, the sensors 220 (FIG. 2), or combinations thereof.

Figure 8:
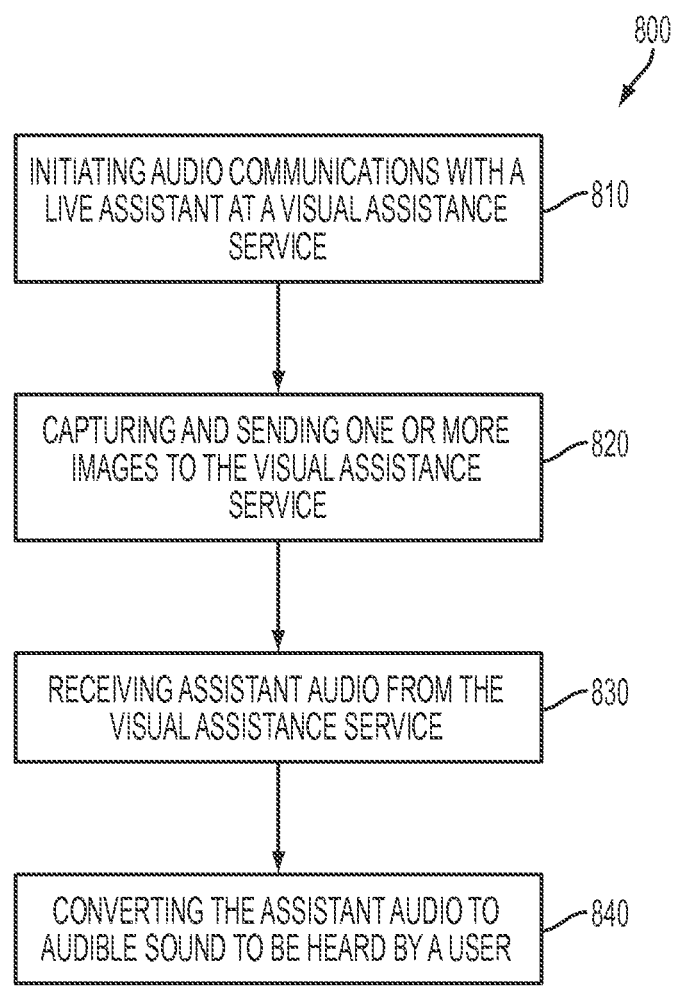
FIG. 8 is a flowchart illustrating a method of operating the visual assistance system of FIG. 1.

FIG. 8 is a flowchart 800 illustrating a method of operating a visual assistance system 100. Referring to FIGS. 2 and 8 together, at operation 810 the method may comprise initiating audio communications with a live assistant at a visual assistance service 104. In some embodiments, initiating audio communications may comprise transmitting a request to initiate a communication session to the visual assistance service 104 responsive to the user of the user device 102, 302 engaging the user input device 214. In some embodiments, the user may initiate a request verbally, such as by speaking a command into the microphone 218.

At operation 820, the method may comprise capturing and transmitting one or more images 106 to the visual assistance service 104. In some embodiments, capturing the one or more images 106 may comprise capturing video images. In some embodiments, capturing the one or more images 106 may comprise capturing still images. In some embodiments, capturing the one or more images 106 may comprise capturing images 106 from a plurality of different perspectives.

At operation 830, the method may comprise receiving assistant audio 112 from the visual assistance service. The assistant audio 112 may comprise the live assistant's description of the one or more images 106. In some embodiments, receiving assistant audio 112 may comprise receiving assistant audio 112 comprising the a live assistant's verbal warnings of obstacles seen in the one or more images 106. In some embodiments, receiving assistant audio 112 may comprise receiving assistant audio 112 comprising the live assistant's verbal description of an object seen in the one or more images 106. In some embodiments, receiving assistant audio 112 may comprise receiving assistant audio 112 comprising the live assistant's speech reading text seen in the one or more images 106. In some embodiments, receiving the assistant audio 112 may comprise receiving assistant audio 112 comprising the live assistant's directions or other instructions for finding an object or location seen in the one or more images 106.

At operation 840, the method may comprise converting the assistant audio 112 to audible sound to be heard by the user of the user device 102, 302. Converting the assistant audio 112 to audible sound may comprise applying the assistant audio 112 to the speaker 222. In some embodiments, applying the assistant audio 112 to the speaker 222 may comprise applying the assistant audio 112 to a speaker 222 in an earphone 400 (FIG. 4), a mobile communication device, or other suitable device that includes the speaker 222.

Figure 9:
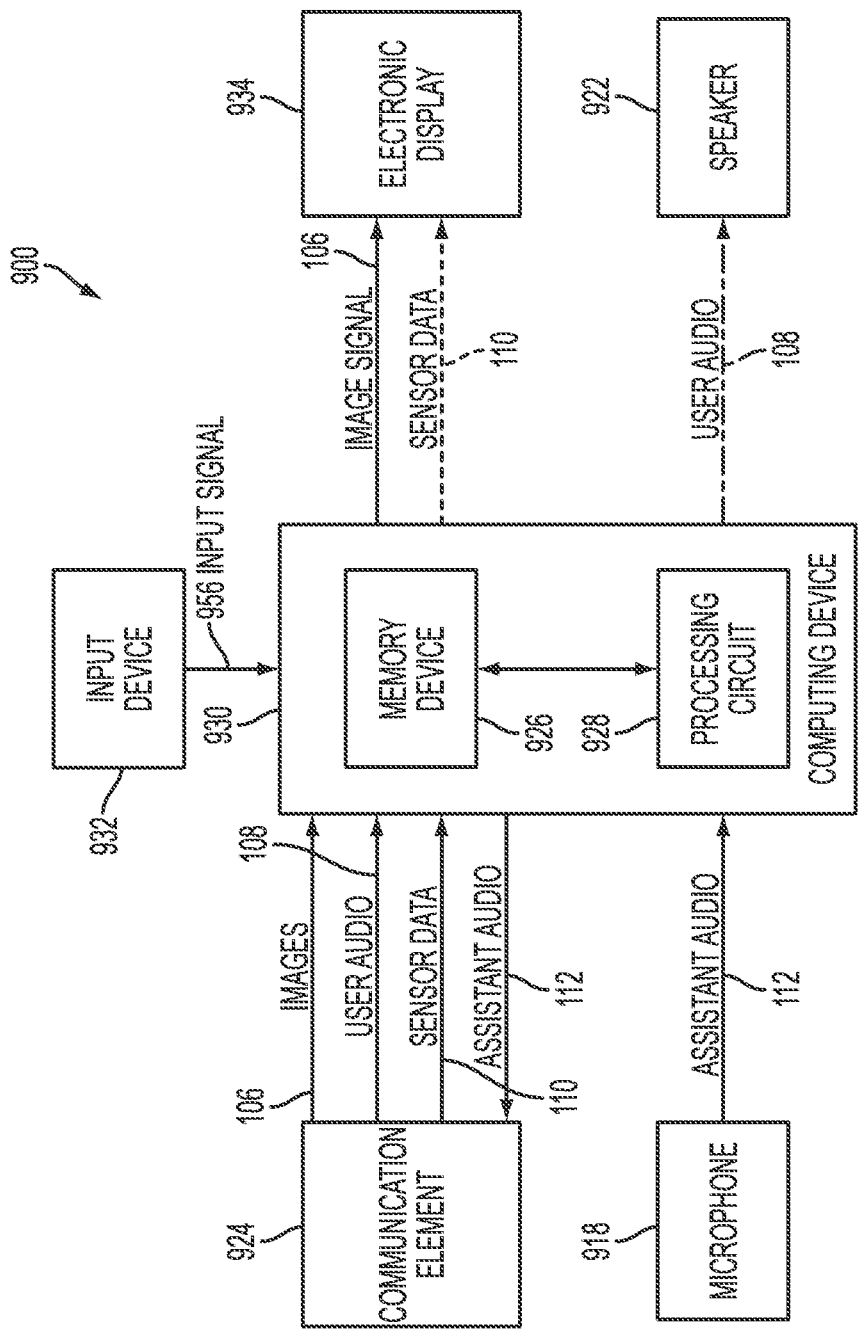
FIG. 9 is a simplified block diagram of a call station for a live assistant at the visual assistance service of FIG. 1.

FIG. 9 is a simplified block diagram of a call station 900 for a live assistant at the visual assistance service 104 of FIG. 1. As discussed above, the visual assistance service 104 may be organized as a call center that includes a plurality of live assistants at their call stations 900 that await calls from the visually-impaired users to provide the desired assistance.

The call station 900 may comprise a computing device 930 operably coupled to at least one communication element 924 (sometimes referred to herein as "communication element 924"), a microphone 918, a speaker 922, an electronic display 934, and an input device 932. The call station 900 may be configured to participate in communication sessions with the user device 102, 302. For example, the call station 900 may be configured to receive a request from the user device 102, 302 to participate in a communication session (e.g., a call). The call station 900 may be configured to participate in the communication session responsive to the live assistant accepting the request to participate in the communication session.

Figure 10:
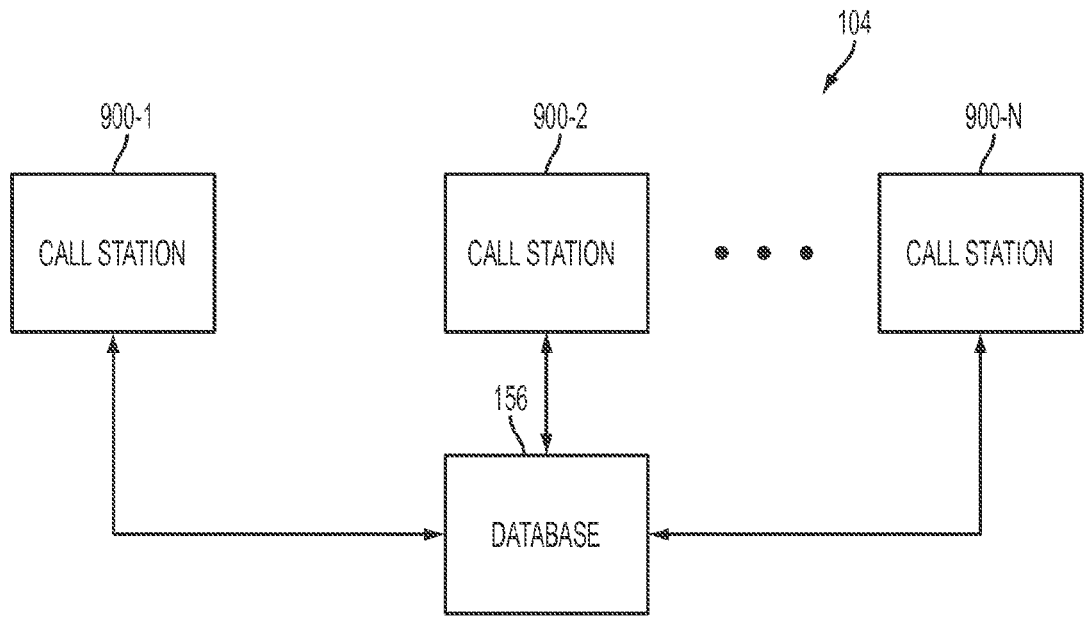
FIG. 10 is a simplified block diagram of an exemplary visual assistance service.

In some embodiments, the computing device 930 may include a memory device 926 configured to store the database 156 (FIG. 1) identifying people who are registered with the visual assistance service 104 as having at least a minimum level of visual disability. In some embodiments, the database 156 may be stored externally to the call station 900 (e.g., at the visual assistance service 104, as illustrated in FIG. 10), and the call station 900 may be configured to access the database (e.g., via the communication element). The call station 900 may be configured to receive requests to participate in communication sessions with user devices 102, 302 operated by people registered in the database 156. For example, the user of the user device 102, 302 may be identified by the database 156 as registered with the visual assistance service 104 as having the minimum level of visual disability. By way of non-limiting example, the minimum level of visual disability may be legal blindness. Also by way of non-limiting example, the visual assistance service 104 may establish its own criteria or testing methodology for determining whether a person has the minimum level of visual disability.

During communication sessions, the computing device 930 may receive the images 106 from the user device 102, 302 through the communication element 924, and cause the electronic display 934 to display the images 106 for the live assistant (e.g., a trained professional in a visual assistance facility). The computing device 930 may also receive the assistant audio 112 from the microphone 918, and transmit the assistant audio 112 to the user device 102, 302 through the communication element 924. In addition, the computing device 930 may receive the user audio 108 from the user device 102, 302 through the communication element 924, and provide the user audio 108 to the speaker 922. The input device 932 may convert the live assistant's interactions with the input device 932 to an input signal 956 and deliver the input signal 956 to the computing device. Furthermore, in some embodiments, the computing device 930 may receive sensor data 110 from the user device 102, 302 through the communication element 924.

The microphone 918, the speaker 922, and the communication element 924 may be similar to the microphone 218, the speaker 222, and the communication element 224 of the user device 102, as discussed with respect to FIG. 2. The electronic display 934 may be configured to display the images 106 from the user device 102, 302. The electronic display 934 may comprise a liquid crystal display, a light-emitting diode (LED) array, a plasma display, a cathode ray tube (CRT) display, other suitable electronic display, or combinations thereof. The electronic display 934 may also be configured to display information from the sensor data 110. In addition, the input device 932 may be configured to enable the live assistant to interact with information and images displayed on the electronic display 934. Accordingly, the electronic display 934 and the input device 932 may together form a user interface. The input device 932 may comprise a keyboard, a mouse, a button array, a touch-screen (e.g., implemented together with the electronic display 934), other input devices, and combinations thereof. The input device 932 may also enable the live assistant to control the camera 216 (FIG. 2) of the user device 102, 302 during communication sessions. For example, the input device 932 may enable the live assistant to activate and deactivate the camera 216, cause the camera 216 to take still images, change the direction the camera 216 is pointed, and combinations thereof.

The computing device 930 may comprise a processing circuit 928 operably coupled to the memory device 926. The memory device 926 and the processing circuit 928 may be similar to the memory device 226 and the processing circuit 228 of the control circuit 230, as discussed above with respect to FIG. 2, except that the memory device may be configured to store computer-readable instructions directed to implementing at least a portion of the functions the computing device 930 is configured to perform. The processing circuit 928 may be configured to execute the computer-readable instructions stored on the memory device 926.

In some embodiments, the computing device 930 may also be configured to analyze the sensor data 110. By way of non-limiting example, the computing device 930 may be configured to determine a velocity with which the user is traveling via GPS data and/or accelerometer data. Also by way of non-limiting example, the computing device 930 may be configured to determine how many steps the user is taking per unit distance of travel via the GPS data and the accelerometer data. As a further example, the computing device 930 may be configured to indicate the existence and/or the location of any detected obstacles or hazards via motion sensor data and/or ultrasonic proximity sensor data. The computing device 930 may be configured to cause the electronic display 934 to display the sensor data 110 and/or the results of analyses of the sensor data 110.

Thus provided with images 106, and sensor data 110, the live assistant may be enabled to provide a variety of services to the user of the user device 102, 302. For example, the live assistant may serve the user by reading signs, documents, and other textual information, providing navigational directions, identifying products in a store, warning the user of obstacles and hazards, and analyzing and describing body language of people around the user. The live assistant may also help the user navigate unknown locations. In addition, the live assistant may help the user to learn how to accomplish tasks related to a new job, or adjust to a new environment after a recent change in place of residence or work. Many other services are also contemplated.

In some embodiments, the visual assistance service 104 may also be configured to provide visually-impaired users some of the capabilities currently available to visually-capable users of standard and cellular telephones. For example, as previously mentioned, the visual assistance service 104 may be configured to serve as a call routing service. The live assistant may converse with the user via user audio 108 and assistant audio 112 to obtain information needed to route the call to another person's communication device (e.g., telephone, cellular phone, etc.). For example, the user may provide a telephone number, a name, or other identifying information to the live assistant. The live assistant may dial the provided telephone number, or look up the telephone number using the name, or identifying information provided by the user. In some embodiments, a contacts list comprising telephone numbers of people the user knows may be stored on the memory device 926, the database 156 (FIG. 1), or a combination thereof.

In some embodiments, the memory device 926, the database 156, or a combination thereof may also be configured to store a call history, voice messages, text messages, other information, and combinations thereof. The live assistant may access the information, and pass the information to the user of the user device via assistant audio 112. For example, the computing device may play a voice message via assistant audio 112 for a user. Also, the live assistant may read text messages to the user over assistant audio 112. In addition, the user may tell the live assistant what to type for an outgoing text message to someone else. Furthermore, the user may ask for details about the user's call history, missed calls, and other information via user audio 108, and the live assistant may provide the details via assistant audio 112. Thus, the live assistant and the visual assistance service 104 may together serve as a virtual telephone or cellular phone user interface for the user.

In some embodiments, the visual assistance service 104 may be configured to enable people to volunteer as live assistants. By way of non-limiting example, a person's personal computing device (e.g., computer, smartphone, or tablet computer) may be modified with software (e.g., a web application, a locally stored software application, etc.) to perform the functions of the call station 900. The personal computing device may include an electronic display, a speaker, a microphone, and an input device that may serve as the electronic display 934, the speaker 922, the microphone 918, and the input device 932. The personal computing device may be configured to receive the images 106, the user audio 108, and in some embodiments the sensor data 110, and transmit the assistant audio 112 through the internet. As a result, people may be enabled to volunteer as live assistants. Furthermore, family members or friends may thus be enabled to act as live assistants.

FIG. 10 is a simplified block diagram of an exemplary visual assistance service 104. The visual assistance service 104 may include the database 156 and one or more call stations 900-1, 900-2, . . . 900-3 (sometimes referred to herein simply individually as "call station 900," and together as "call stations 900"). As previously discussed, the visual assistance service 104 may be configured as a call center that includes a plurality of live assistants at the call stations 900 that await calls from the visually-impaired users to provide the desired assistance. In some embodiments, the visual assistance service 104 may include a plurality of call centers comprising one or more call stations 900. Each call station 900 may be configured to access information stored in the database 156.

The database 156 may include a listing of people registered with the visual assistance service 104 as being eligible to receive the services provided by the visual assistance service 104. As previously discussed, a person may be eligible to receive the services if the person has a minimum level of visual disability.

As also previously discussed, the database 156 may store information relating to call routing services for user devices 102 (FIG. 1) belonging to people registered with the visual assistance service 104. By way of non-limiting example, call histories, voice messages, text messages, other information, and combinations thereof may be stored in the database 156.

The database 156 may additionally be configured to store information that may assist the live assistants at the call stations 900 to interpret images 106 and sensor data 110 received from user devices 102 (FIG. 1). By way of non-limiting example, the database 156 may store images that may be compared to the images 106 received from user devices 102 to assist in identifying objects in the images 106. Also by way of non-limiting example, the database 156 may store information to compare to sensor data 110 from an ultrasonic proximity sensor of a user device 102 to assist in identifying an obstacle detected by the ultrasonic proximity sensor.

Figure 11:
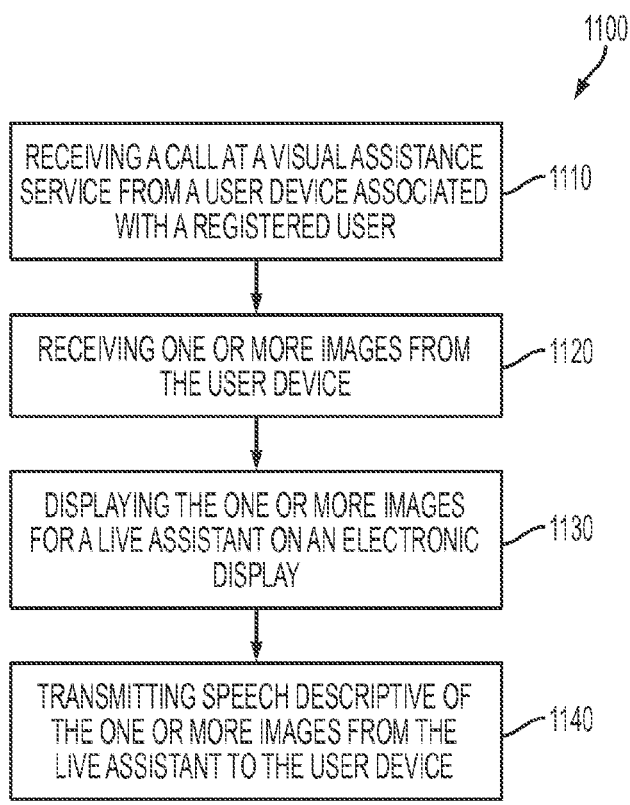
FIG. 11 is a flowchart illustrating another method of operating the visual assistance system of FIG. 1.

FIG. 11 is a flowchart 1100 illustrating another method of operating a visual assistance system 100. Referring to FIGS. 9 and 11 together, at operation 1110 the method may comprise receiving a call at a call station 900 of a visual assistance service 104 from a user device 102 (FIG. 1) associated with a registered user. The user may be registered with the visual assistance service 104 as having at least a minimum level of visual disability. At operation 1120, the method may comprise receiving one or more images 106 from a user device 102, 302 (FIGS. 1, and 3) at the visual assistance service 104. In some embodiments, receiving the one or more images 106 may comprise receiving video images, still images, or a combination thereof.

At operation 1130, the method may comprise displaying the one or more images 106 for the live assistant on the electronic display 934 of the visual assistance service 104. At operation 1140, the method may comprise transmitting assistant audio 112 comprising speech descriptive of the one or more images from the live assistant to the user device 102, 302. Transmitting speech descriptive of the one or more images 106 may comprise converting audible speech from the live assistant to the assistant audio 112, and transmitting the assistant audio to the user device 102, 302 through the communication element 924. In some embodiments, transmitting speech descriptive of the images 106 may comprise transmitting speech comprising warnings of obstacles or hazards seen in the images 106, description of products in a store, spoken text seen in the images 106, other speech, or combinations thereof. In some embodiments, transmitting speech may also comprise transmitting speech comprising information derived from sensor data 110 received from the user device 102, 302.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A visual assistance system, comprising:
a visual assistance service comprising a database identifying a plurality of user devices that are registered with the visual assistance service as being associated with a plurality of users having at least a minimum level of visual disability, the visual assistance service configured to:
receive a call from a user device of the plurality of user devices;
receive one or more video images or still images taken of an environment proximate to the user device;
display the one or more video images or still images on an electronic display for a live assistant;
transmit assistant audio to the user device, the assistant audio comprising the live assistant's speech conveying information derived by the live assistant's review of the one or more video images or still images;
receive sensor data from the user device,
determine an average number of steps per unit of distance traveled by the user based on accelerometer data from the sensor data;
combine the average number of steps per unit of distance traveled with GPS data from the sensor data to determine a number of steps needed for the user to reach a desired destination; and
display information relating to the sensor data on the electronic display for the live assistant.

2. The visual assistance system of claim 1, wherein the visual assistance service is configured to access at least one of a call history, voice messages, or text messages for each user device.

3. The visual assistance system of claim 1, wherein the visual assistance service is further configured to provide a call routing service for the live assistant of the visual assistance service to route the call to connect the user device with a third party.

4. The visual assistance system of claim 3, wherein the visual assistance service is configured to access a contacts list for each user device and route the call to a contact from the contacts list.

5. A method of operating a visual assistance system, comprising:
receiving a call from a user device by a visual assistance service, the user device being registered with the visual assistance service as being associated with a user having at least a minimum level of visual disability;
receiving one or more images from the user device at the visual assistance service during the call;
displaying the one or more images for a live assistant on an electronic display at the visual assistance service;
transmitting assistant audio comprising speech descriptive of the one or more images from the live assistant to the user device;
receiving one or more sensor signals comprising sensor data from the user device;
determining an average number of steps per unit of distance traveled by the user based on accelerometer data from the sensor data;
combining the average number of steps per unit of distance traveled with GPS data from the sensor data to determine a number of steps needed for the user to reach a desired destination; and
displaying the sensor data on the electronic display for the live assistant.

6. The method of claim 5, further comprising routing the call from the visual assistance service to connect the user device to a third party device during the call.

7. The method of claim 6, wherein routing the call from the visual assistance service includes connecting the user device to a contact from a contact list of the user device that is accessible by the live assistant through the visual assistance service.

8. The method of claim 6, wherein routing the call from the visual assistance service includes connecting the user device to an emergency service.

9. A visual assistance system, comprising:
a user device configured to:
initiate a call to a visual assistance service for a user that is registered with the visual assistance service as having at least a minimum level of visual disability;
capture one or more images;
transmit the one or more images to the visual assistance service;
receive assistant audio descriptive of the one or more images from a live assistant at the visual assistance service;
reproduce the assistant audio as audible sound to the user of the user device;
generate sensor data including at least accelerometer data and GPS data; and
transmit the sensor data to the visual assistance system, wherein at least one of the user device or the visual assistance system is configured to:
determine an average number of steps per unit of distance traveled by the user based on the accelerometer data; and
combine the average number of steps per unit of distance traveled with GPS data to determine a number of steps needed for the user to reach a desired destination.

10. The visual assistance system of claim 9, wherein the user device comprises one or more sensors configured to generate the sensor data, the one or more sensors selected from the list consisting of a global positioning system (GPS) device, a motion detector, an ultrasonic proximity sensor, and an accelerometer.

11. The visual assistance system of claim 10, wherein the user device is configured to provide an audible alert responsive to the user device detecting an obstacle based on the sensor data from the one or more sensors.

12. The visual assistance system of claim 9, wherein the user device comprises a standalone device comprising:
a control circuit;
a camera operably coupled to the control circuit and configured to capture the one or more images;
a communication element operably coupled to the control circuit and configured to transmit the one or more images to the visual assistance service, and receive the assistant audio from the visual assistance service; and
an audio output device operably coupled to the control circuit configured to convert the assistant audio to audible sound to be heard by the user.

13. The visual assistance system of claim 9, wherein the user device comprises a mobile communication device and one or more separate devices configured to communicate with the mobile communication device.

14. The visual assistance system of claim 13, wherein the one or more separate devices comprise one or more devices selected from the list consisting of an earphone, a pair of glasses, a watch, and a mobility cane.

15. The visual assistance system of claim 9, further comprising a dedicated call button separate from other input devices, wherein the dedicated call button is configured to initiate a call directly to the visual assistance service responsive to a user input without dialing a full phone number.

16. The visual assistance system of claim 15, wherein the dedicated call button is a textured call button to enable the visually-impaired user to locate the dedicated call button by touch.

17. The visual assistance system of claim 9, wherein the threshold level is based on acceleration data from the sensor data.

18. The visual assistance system of claim 9, wherein the user device is configured to maintain a contacts list, and enable the visual assistance service to have access to the contacts list for routing the call to contacts therein during the call.

19. The visual assistance system of claim 9, wherein the user device is configured to automatically initiate the call responsive to a detection of a condition outside of a threshold level based on sensor data recorded by the user device.

* * * * *